United States Patent Office.

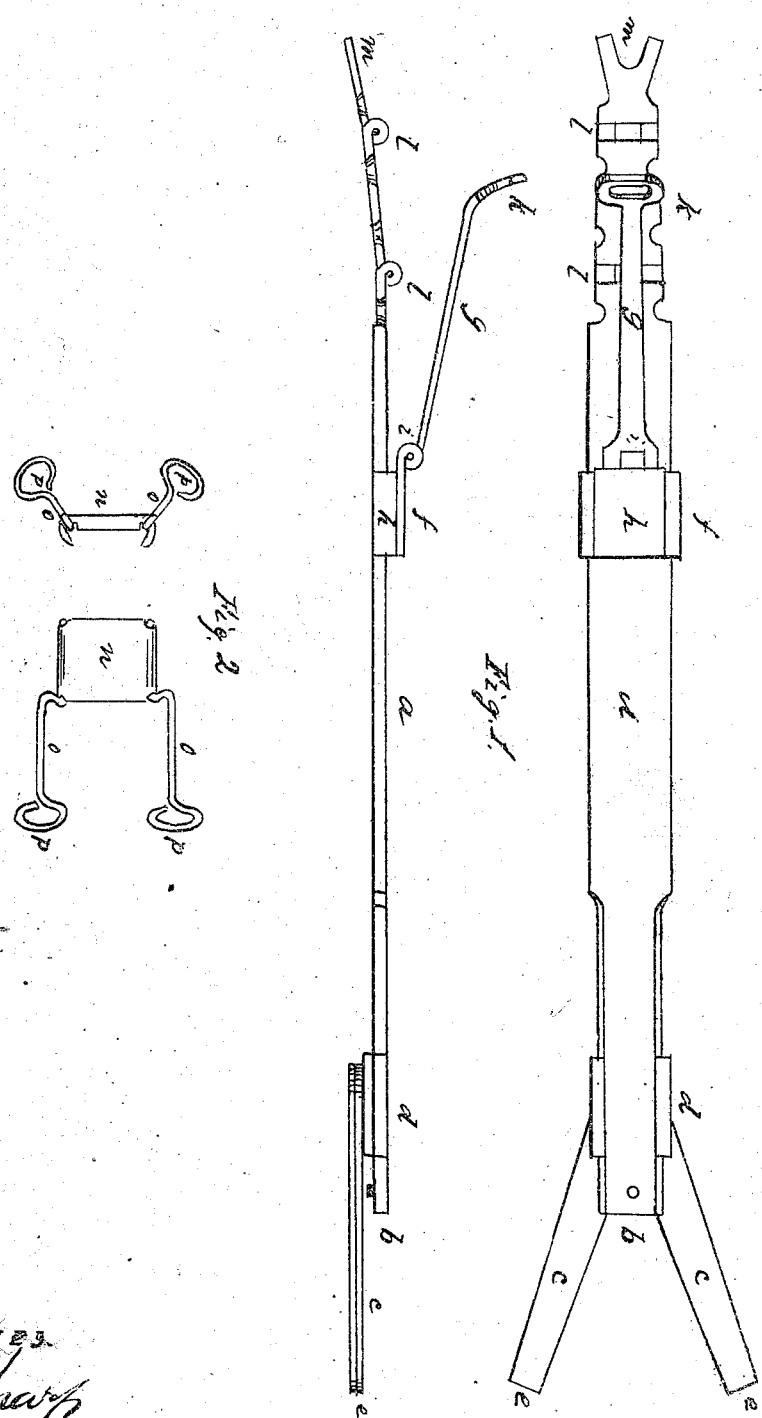

ALEXANDER HARROUN, JR., OF SOUTH ONONDAGA, NEW YORK

Letters Patent No. 75,632, dated March 17, 1868; antedated March 4, 1868.

IMPROVEMENTS IN HARNESS.

The Schedule referred to in these Letters Patent and making part of the same.

TO ALL WHOM IT MAY CONCERN:

Be it known that I, ALEXANDER HARROUN, Jr., of South Onondaga, in the county of Onondaga, and State of New York, have invented a new and useful Improvement in Harness; and I do hereby declare that the following is a full and exact description thereof, reference being had to the accompanying drawings, and to the letters of reference marked thereon.

This improvement may be employed with the harness in common use, and is designed to prevent the lines with which an animal is guided or driven, being drawn under the animal's tail, or come in unpleasant contact with the tail.

The mode in which this improvement accomplishes its object will appear from the following-described arrangement for holding and supporting the lines.

The rod $a$, Figure 1, of the accompanying drawings, I make of any suitable metal or material, and of such thickness as is necessary to bear the pressure and strain to which it may be exposed. I make it round or square, or any other shape, and its length I proportion to the size of the animal upon which it is to be used. This rod, when in use, will be placed over the centre of the animal's back, and parallel with it. The end of the rod referred to by the letter $b$, fig. 1, is intended to be to the rear of the place where the back-band usually crosses the animal's back, but may be extended farther toward the neck. The arms $c$, fig. 1, are attached to the movable clasp $d$, fig. 1, by a common joint. The ends of these arms, referred to by the letter $e$, fig. 1, I attach to the back-band of a harness, or to a substitute for a back-band, by any suitable device, unless the rod $a$ or the arms $c$ are extended farther forward, in which case I attach them to the hames or collar, or to a substitute for them. The clasp $d$, fig. 1, I make movable, upon the rod $a$, and by a suitable device I make it stationary at any desired point upon that part of the rod over which it is designed to move. The clasp $f$, fig. 1, I also make movable upon the rod $a$, and by any suitable device I make it stationary at such points upon the rod as may be chosen. To the clasp $f$ I attach the arm $g$, fig. 1, by a double joint or its equivalent. This joint is referred to by the letters $h$ and $i$, fig. 1.

One part of the joint permits the arm to turn to the right or left and the other part permits it to be raised or depressed, and by a suitable device I hold it in any desired position, which may be obtained from these motions. At the end of the arm $g$, and at the place indicated by the letter $k$, fig. 1, I make an opening, through which the lines for guiding the animal may pass.

When two arms are found more convenient than the single arm $g$, I make use of two. A part of the rod $a$, I make pliant, by joints, or their equivalent. That part and the joints are referred to by the letter $l$, fig. 1. The end of the rod $a$, referred to by the letter $m$, fig. 1, I make to form a part of a crupper, or attach it to a crupper, by any suitable arrangement.

When the object of this improvement can be best attained by separating the guiding-lines, at or near the place where they pass the animal's tail, I make use of the arrangement represented by Figure 2 of the accompanying drawings. That part of fig. 2 indicated by the letter $n$ is a movable clasp, to be placed upon the rod $a$ in place of the clasp referred to by the letter $f$, fig. 1. The arms, referred to by the letter $o$, fig. 2, I attach to the clasp $n$ by any form of joint which shall make them most serviceable. Through the ends of the arms $o$, at the places referred to by the letter $p$, fig. 2, I make openings for the driving-lines to pass.

I claim as my invention, the rod $a$, fig. 1, or its equivalent, when employed substantially as and for the purpose set forth.

I also claim the arms $c$, when connected by a common joint, or its equivalent, and employed substantially as and for the purpose set forth.

I also claim the combination of the clasp $f$ and the arm $g$, or their equivalent, when employed substantially as and for the purpose set forth.

I also claim the clasp $n$, fig. 2, and the arms $o$, in combination, or their equivalent, when employed substantially as and for the purpose set forth.

ALEXANDER HARROUN, JR.

Witnesses:
JOHN SHARP,
THOS. H. YOUNGMAN.